United States Patent [19]

Murray

[11] Patent Number: 5,406,432

[45] Date of Patent: Apr. 11, 1995

[54] AIR BEARING MAGNETIC HEAD SLIDERS WITH SEPARATE CENTER RAIL SEGMENTS

[75] Inventor: Stephen S. Murray, Fremont, Calif.

[73] Assignee: Read-Rite Corporation, Milpitas, Calif.

[21] Appl. No.: 132,832

[22] Filed: Oct. 7, 1993

[51] Int. Cl.⁶ .............................................. G11B 5/60
[52] U.S. Cl. ..................................................... 360/103
[58] Field of Search ......................................... 360/103

[56] References Cited

U.S. PATENT DOCUMENTS 4,894,740  1/1990  Chhabra et al. .................... 360/103

*Primary Examiner*—A. J. Heinz
*Attorney, Agent, or Firm*—Nathan N. Kallman

[57] ABSTRACT

An air bearing magnetic head slider with leading and trailing edges and substantialy parallel sides has a pair of side rail members and a two segment center rail member. The side rail members extend on the slider from the leading edge to a position which is less than the distance between the leading edge and the trailing edge, while the center rail member extends to the trailing edge from the leading edge. This structure permits near or pseudo-contact between a transducer located on the trailing edge and a magnetic recording disk over which the slider flies.

11 Claims, 3 Drawing Sheets

AIR BEARING MAGNETIC HEAD SLIDERS WITH SEPARATE CENTER RAIL SEGMENTS

CROSS-REFERENCE TO COPENDING PATENT APPLICATIONS

Copending U.S. patent application Ser. No. 07/982,853 filed Nov. 30, 1992, discloses magnetic head sliders having air bearing surfaces with configured rails.

Copending U.S. patent application Ser. No. 08/024,476, filed Mar. 1, 1993, now allowed, discloses a head slider having a "wishbone" shaped center rail member which reduces or eliminates the possibility of stray particles becoming trapped between the slider and the disk. This application is incorporated herein by reference.

BACKGROUND OF THE INVENTION

1. Field of the Invention

This invention relates to air bearing magnetic head sliders used in disk drives and in particular to head sliders with configured air bearing surfaces.

2. Prior Art

A magnetic recording head assembly used in a disk drive typically incorporates an air bearing slider carrying at least one magnetic transducer that flies over the surface of a magnetic disk for transducing data signals. One objective for improving the transducing relationship between the magnetic transducer and the magnetic disk is to provide a low flying height or very close spacing between the transducer and the disk during operation of the disk drive. When used with very narrow transducing gaps and very thin magnetic films, the close spacing allows high density signals to be recorded, thereby producing high storage capacity recording. It is also desirable to maintain a substantially constant flying height and a tightly controlled pitch of the slider relative to the disk surface so that the signal being processed from the transducer is accurate. To realize controlled pitch and constant flying height, pitch stiffness of the air bearing slider must be controlled.

SUMMARY OF THE INVENTION

In accordance with the present invention, a variety of slider structures are provided which represent an improvement over the above-identified wishbone structure of Ser. No. 08/024,476 in providing for closer spacing between the disk and the trailing edge of the slider which carries the transducer.

The sliders disclosed herein may be described by the following:

There are four air bearing surfaces which reside substantially in the same plane. Three of these air bearing surfaces have leading edge tapers, each taper having the same nominal angle in the range of 10 to 120 minutes of arc. The surface without a leading edge taper is intended to carry the active transducer. At most, two of the air bearing surfaces reach the trailing edge, and the transducer-bearing surface always reaches the trailing edge.

The length of the slider body is nominally between 0.030 and 0.112 inches, and the slider width is between 60 and 85 percent of the length. The slider height is arbitrary, but will typically be between 20 and 35 percent of the length.

Neither of the side rails, with tapers on the leading edge, reach the trailing edge. The side rail length, including tapers is between 30 and 95% of the body length. All angles are cut such that airflow will be in a direction which purges particles from any location in the etched cavity.

The preferred method of fabrication is to etch the pattern to a given depth. Known methods to accomplish this are:

reactive ion etching, ion milling, ultrasonic contact probe etching, laser etching, laser-assisted chemical etching, masked chemical etching without laser assist, and electro-chemical etching, provided that the substrate material permits this operation.

The range of minimum etch values for realistic disk drive applications is 3 to 15 microns. The maximum allowable depth on some designs would be comparable to present saw-cut technology depths, or 50 to 100 microns.

Because the forward rails in the structure described herein carry the bulk of the load on an air film, pseudo-contact recording with very little operating friction may be performed. This allows high density disk recording with very low wear rates for the recording transducer and disk.

The structures of the invention include two side rail members on the non-magnetic slider body, the side rail members extending from the slider leading edge to a position which is less than the distance from the leading edge to the trailing edge. The structures also include a central rail member extending from the leading edge to the trailing edge. The central rail member comprises two separate segments, one of which is disposed on the trailing edge of the slider adjacent the transducer. The other segment of the center rail is spaced from the first segment and is in the form of a wishbone or fork member which has fork portions extending on either side of the first segment. By locating the transducer in approximately the center of the trailing edge of the slider and with the provision of the segment of the center rail member adjacent the transducer, this segment produces air bearing lift while permitting the transducer to operate in virtual or psuedo-contact with the disk, thereby improving the obtainable minimum spacing and maximum bit density. By locating the transducer in approximately the center of the trailing edge of the slider, it does not have the sensitivity to roll that a transducer located on one side of the slider has, particularly during disk startup when "chattering" may occur as one of the slider side rails contacts the disk, or the two side rails make rapidly alternating disk contact.

DESCRIPTION OF THE PREFERRED EMBODIMENTS

Figure 1:
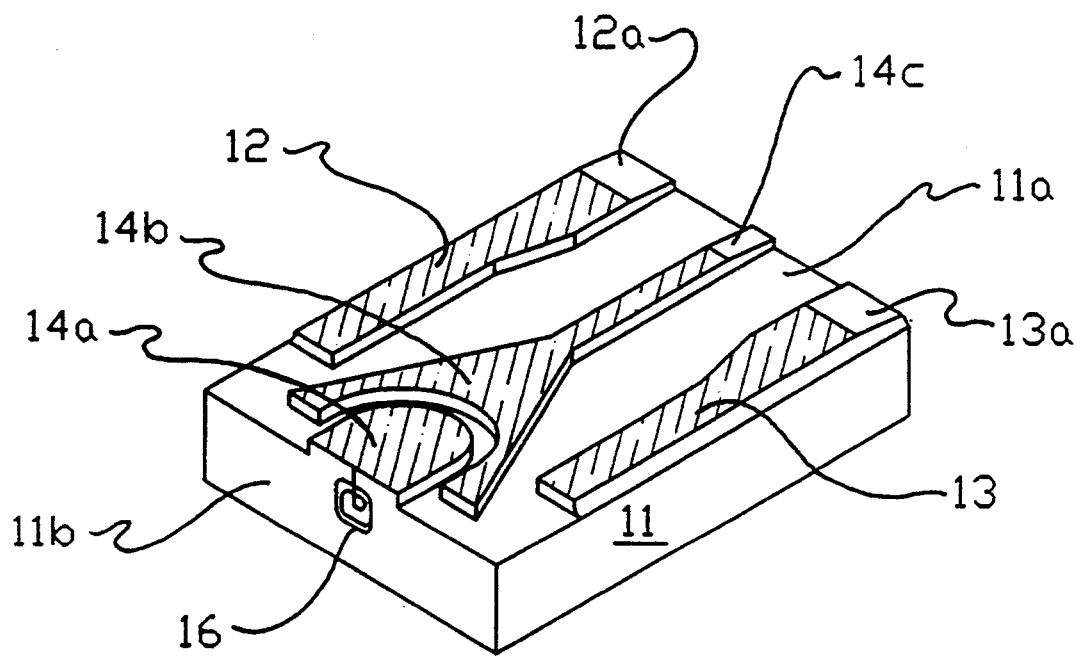
FIG. 1 is a perspective view of one embodiment of the invention in which the second segment of the center rail member extends to a location on the sides of the first segment but does not extend to the trailing edge.

FIG. 1 illustrates one embodiment of the invention in which a non-magnetic slider body 11 has a pair of side rails 12 and 13 formed thereon. Side rails 12, 13 extend from the leading edge 11a of slider body 11 to a position which is less than the distance between the leading edge 11a and the slider trailing edge 11b.

The structure of this invention also includes a center rail member 14 extending from the leading edge to the trailing edge. Center rail 14 is in the form of two separate segments 14a and 14b. Segment 14a is disposed on the trailing edge 11b adjacent a magnetic transducer 16. Segment 14b includes a fork-like portion which extends around segment 14a and is separated therefrom. This structure permits transducer 16 to ride in near contact or psuedo-contact with the disk surface by virtue of Segment 14a, while center rail portion 14b contributes to the air bearing support of the slider.

Side rails 12, 13 have tapered portions 12a, 13a at their leading edges, while center rail segment 14b has a tapered portion 14a at its leading edge.

Figure 2:
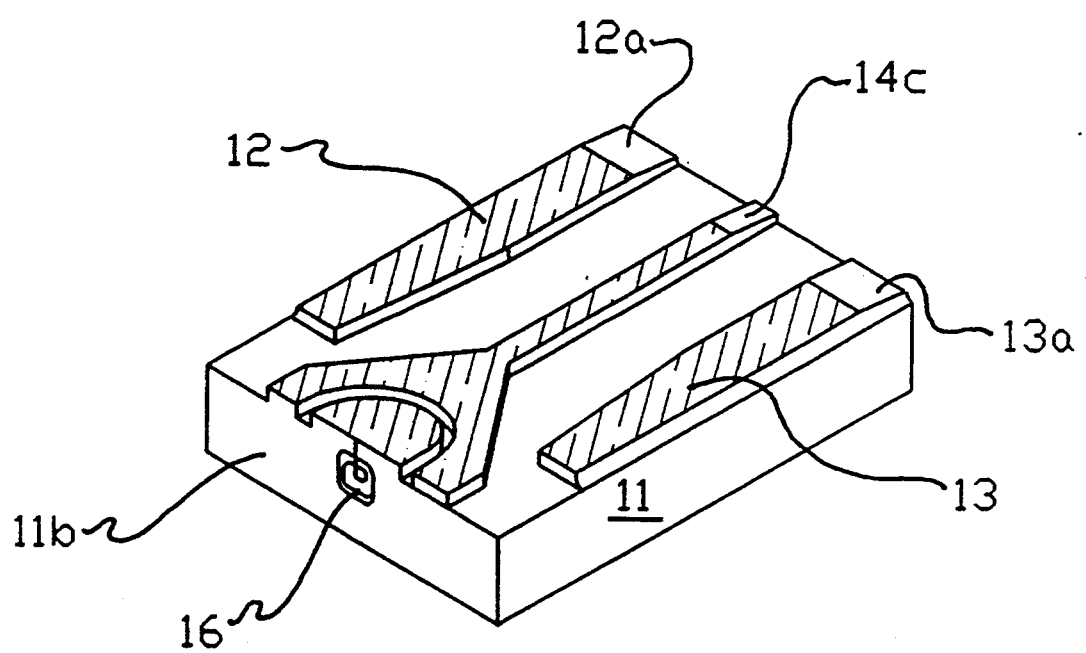
FIG. 2 illustrates an alternate embodiment in which the second segment extends to the trailing edge.

FIG. 2 illustrates one alternate embodiment of the invention in which the fork-like legs of center rail segment 14b wrap completely around segment 14a. While the leading center rail segment 14b may wrap completely around the sides of the transducer bearing pad 14a if processes such as design requirements associated with masking and etching require this approach, this is not quite as desirable mechanically. This is because with the same transducer-to-disk spacing, this design will cause the slider to possibly scrape the disk harder and/or more frequently for a given amount of roll.

In such a "wrap around" version, the most narrow spacing between the active pad 14a and the wrapping rail 14b should be at the front of the active pad. It should not constrict, but may be allowed to widen as the trailing edge of the slider is approached.

Figure 3:
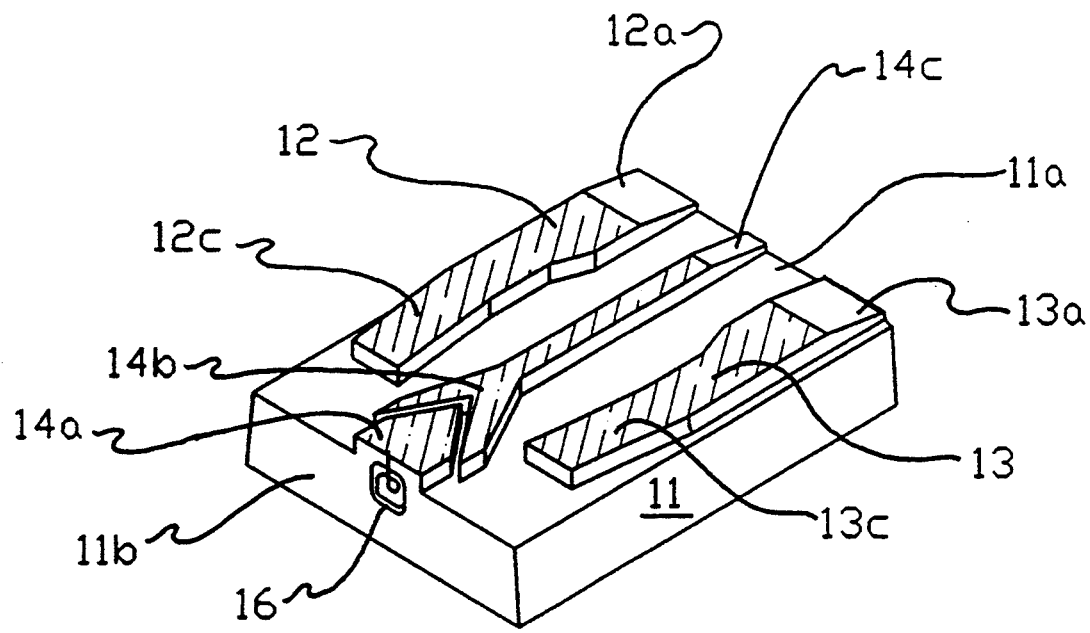
FIG. 3 shows an embodiment in which the portions of the side rail members extending toward the trailing edge are angled inwardly toward the center of the slider body.

FIG. 3 illustrates an embodiment of the invention in which the side rails 12, 13 are angled inwardly as they extend toward the trailing edge. Side rail 12 has a portion 12c which is angled toward the center of slider body 11, while side rail 13 has a portion 13c which has a step portion 13c which is angled inwardly at a smaller angle than side rail 12c. In the embodiment of FIG. 3, center rail 14b has a fork-like segment which is spaced from segment 14a adjacent transducer 16.

This angling of the side rails is such that roll is reduced across the radius range of slider application. This roll is usually caused by two factors:
1. When track radius decreases, the velocity ratio of outer rail velocity to inner rail velocity increases.
2. Since most disk drives use rotary actuators, slider skew changes with track radius, and this skew contributes to roll.

Practical bend angles are in the range of 0–25 degrees for the rail 12 on the outer disk radius side 12 of the slider, and 0 to 15 degrees for the inner disk radius rail 13.

Figure 4:
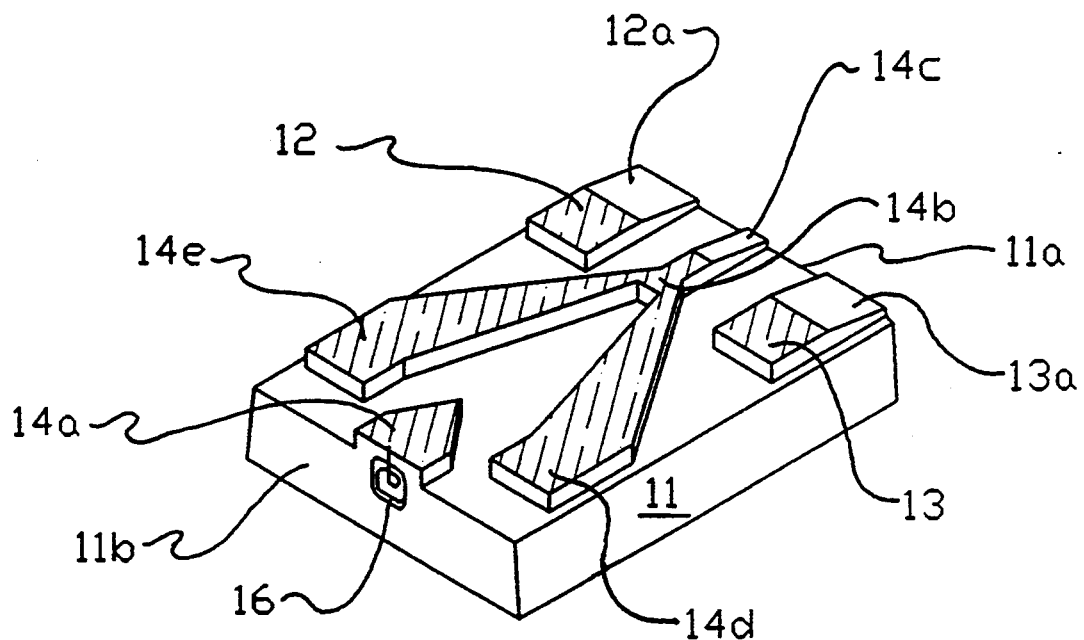
FIG. 4 illustrates an embodiment in which the side rail members are shortened and the second segment of the center rail member is in the form of a wishbone having fork members disposed on either side of the first segment.

FIG. 4 illustrates another embodiment of the invention in which the length of the side rails 12, 13 is shortened so that they extend only a relatively short distance from the leading edge 11a toward the trailing edge 11b.

By thus shortening the taper bearing side rails, the split in the leading center rail 14 can be broadened into a wishbone shape having fork legs 14d and 14e. This creates a large area within the wishbone in which a vacuum will form. The degree of vacuum is velocity dependent based on disk RPM and track radius so the slider loading increases with application speed.

The surface must be etched to create such a geometry. While the nominal etch depth is application-dependent, the range of minimum etch depth values, with 1.3 to 3.5 inch disk drive applications, is 3 to 15 microns.

Figure 5:
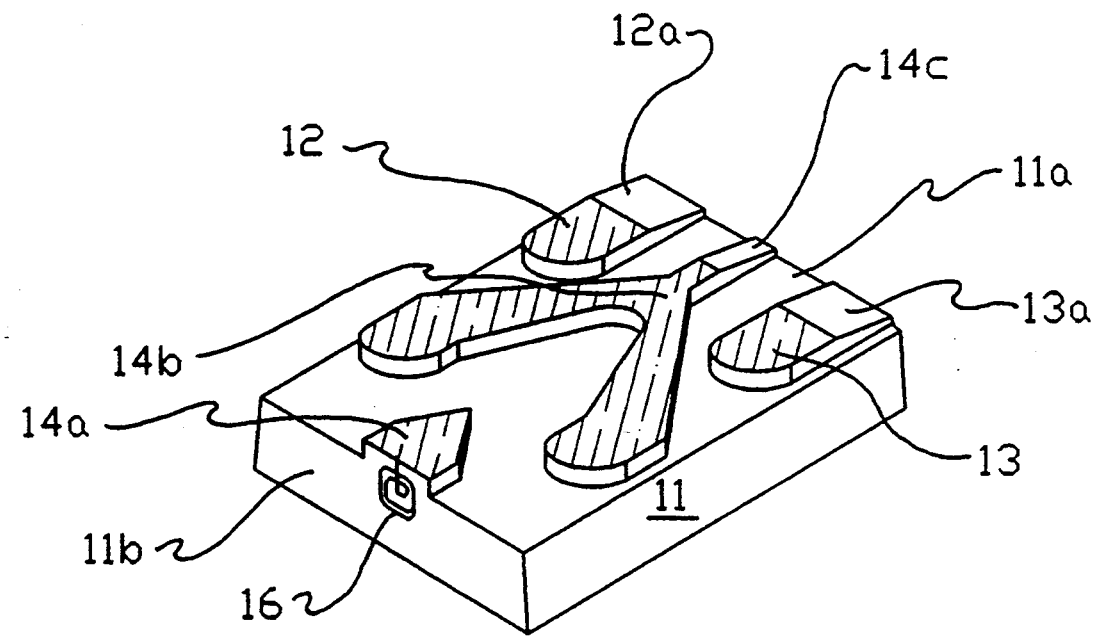
FIG. 5 illustrates a variation of the embodiment of FIG. 4 in which the trailing edges of the side rail members and the center rail member are rounded to improve slider attitude control.

FIG. 5 illustrates another embodiment of the invention in which the trailing edges of the three forward-most edges of the air bearing surfaces of side rails 12, 13 and center rail member 14 are rounded. This rounding of the trailing edges of the three forward-most air bearing surfaces has been shown by finite-difference based air bearing simulation to greatly reduce the vacuum which forms in the four etched areas behind these pads, when compared to the squared-off trailing edges shown in the structure of FIG. 4.

This has an advantage for attitude control because vacuum adds loading. Lift should be around the perimeter, while loading should be approximately centralized for stiffness and resulting control over the distribution of flight attitudes from a given process. Therefore, it is desirable to have a vacuum in the wishbone, but not behind the lifting surfaces.

Figure 6:
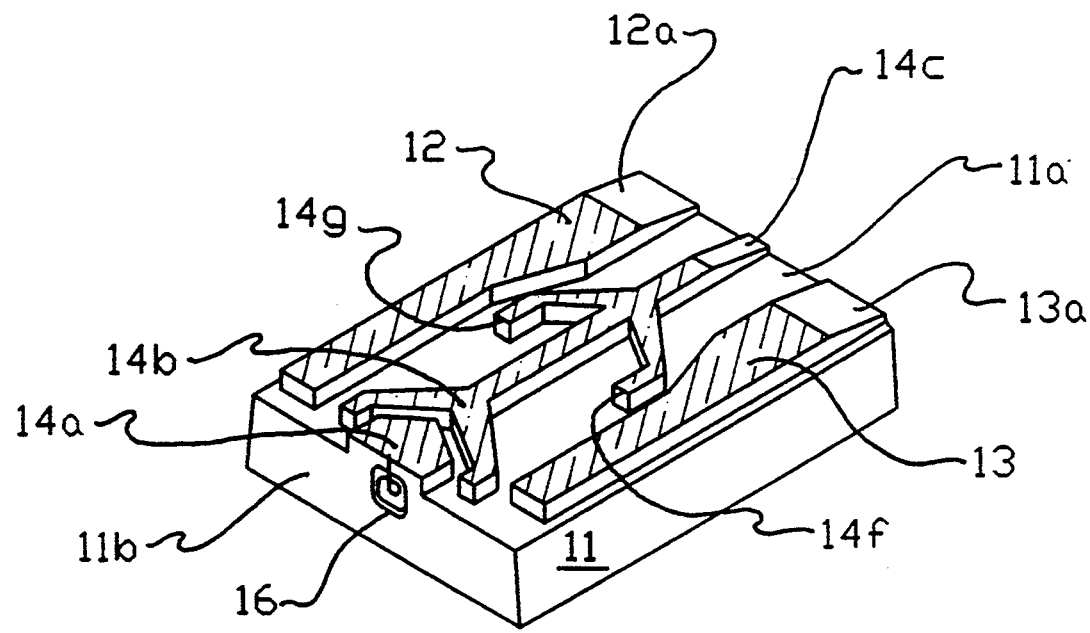
FIG. 6 is a perspective view of a slider in which the second segment of the center rail member has a pair of branching members thereon to increase slider loading with increasing disk rotational speed.

FIG. 6 illustrates an embodiment of the invention in which the center rail segment 14b is provided with a pair of branching members 14f, 14g extending laterally on either side of segment 14b. Branching members 14f, 14g are preferably disposed on center segment 14b closer to leading edge 11a than to trailing edge 11b.

Such a branching structure can be used to create a vacuum near the center of the slider body when operating on a rotating disk. This has the effect of increasing loading with increasing speed. This is useful because higher loading usually produces better dynamic response, but during start/stop cycles, lower loading is associated with less friction, and less required motor torque on the disk spindle. Hence, a slider with increasing load with increasing speed allows for reduced motor torque and better response to disk dynamics.

I claim:

1. An air bearing magnetic head slider body including a nonmagnetic substrate having an air bearing surface with leading and trailing edges and substantially parallel sides, said slider comprising:
   a pair of side rail members and a center rail member;
   tapered portions extending from said leading edge at said sides and at substantially the center between said sides;
   said side rail members extending on said air bearing surface of said slider from said tapered portions at said sides to a position which is less than the distance between said leading edge and said trailing edge;
   said center rail member extending to said trailing edge from
   said tapered portion at substantially the center between said sides;
   said center rail member comprising two separate segments, a cavity separating said segments one of said segments being positioned adjacent said trailing edge and the other segment extending from the leading edge.

2. A slider in accordance with claim 1 in which said slider includes a magnetic transducer positioned close to said one of said segments of said center rail member adjacent said trailing edge.

3. A slider in accordance with claim 2 in which the other of said segments of said center rail member has branching portions disposed on sides of said one segment.

4. A slider in accordance with claim 3 in which said branching portions of said center rail member form a two fork wish-bone structure, said two forks extending from near said leading edge to a location near said trailing edge and having trailing surfaces, said two forks being spaced from said one segment of said center rail member.

5. A slider in accordance with claim 4 in which said trailing surfaces of said side rail members and said other segment of said center rail member have rounded surfaces.

6. A slider in accordance with claim 3 including a pair of branching members extending laterally from said other segment of said center rail member and located between said leading edge and said branching portions.

7. A slider in accordance with claim 3 in which said branching portions extend around the sides of said one segment to said trailing edge.

8. A slider in accordance with claim 3 in which said branching portions extend around said one segment to a position spaced from said trailing edge.

9. A slider in accordance with claim 1 in which said side rail members have portions which extend at an angle to a length of said slider from their tapered portions toward said trailing edge.

10. A slider in accordance with claim 9 in which said side rail members include an outer rail portion and an inner rail portion, the angle of the outer rail portion being greater than the angle of the inner rail portion.

11. A slider in accordance with claim 10 in which the angle of said outer rail is up to 25 degrees and the angle of said inner rail is up to 15 degrees.

* * * * *